Jan. 12, 1971 A. KOBLIN ET AL 3,554,005

CONTINUOUS TAPE SAMPLER

Filed June 10, 1968

INVENTORS
Abraham Koblin
George R. Freeburger

BY Harry M. Saragovitz
Edward J. Kelly, Herbert Berl
& Bernard J. Ohlendorf

ATTORNEYS

United States Patent Office 3,554,005
Patented Jan. 12, 1971

3,554,005
CONTINUOUS TAPE SAMPLER
Abraham Koblin, Pikesville, and George R. Freeburger, Edgewood, Md., assignors to the United States of America as represented by the Secretary of the Army
Filed June 10, 1968, Ser. No. 735,860
Int. Cl. G01n *1/24;* G01w *1/00*
U.S. Cl. 73—28 22 Claims

ABSTRACT OF THE DISCLOSURE

An apparatus and method of operation thereof for instantaneous and continuous monitoring aerosol particle concentration in the atmosphere as a function of time comprising a portable case means, nozzle means located within said case means and extending outside thereof, first feed reel means and a take-up reel means within said case means adapted to pass paper tape adjacent to the end of said nozzle means within said case means, a second feed reel means within said case means adapted to feed plastic tape between layers of said paper tape, means to activate said tapes, means to draw an air sample through said nozzle means, and means to expel said air sample outside of said case means.

The invention described herein may be manufactured, used, and licensed by or for the Government for governmental purposes without the payment to us of any royalty thereon.

Our invention relates to an apparatus and method for the continuous and automatic sampling of air in order to determine concentration of aerosol particles in the air as a function of time. The determination of concentration is accomplished by collecting the particles on paper tape and quantitatively analyzing the collected samples.

The dissemination of aerosol particles into the atmosphere is regularly carried out both militarily and commerically, and this practice has necessitated the development of apparatus and techniques to monitor the atmosphere for the presence and concentration of such matter. While the prior art devices and methods utilized both the non-continuous series of slides mode, such as disclosed in U.S. Patent No. 3,222,925, and the continuous tape mode, such disclosed in U.S. patent application Ser. No. 709,777, now Patent 3,745,965, filed Mar. 1, 1968, each prior art means presented certain monitoring problems. For example, all of the prior means required relatively long periods of time, 10 minutes or longer, to obtain a satisfactory sample, whereas instantaneous, an upper limit of one second, sampling is desirable. Further, the prior art means were bulky and did not admit of ready portability. In addition, the non-continuous series of slides mode presented the problem as discussed on page 2 of U.S. patent application Ser. No. 709,777, now Patent 3,475,965, filed Mar. 1, 1968. Accordingly, the above problems resulted in the conception of our invention and the reduction to practice thereof.

A principal object of our invention is to provide a reliable, compact, portable means for instantaneously, an upper limit of one second, sampling air.

Another object of our invention is to provide a reliable, compact, portable means for instantaneously sampling air, collecting any aerosol particle fallout therein at any given time on paper tape in order to quantitatively analyze and plot concentration distribution curves as a function of time.

An additional object of our invention is to provide a reliable, compact, portable means for instantaneously sampling air and evaluating any particle concentration therein during all conditions irrespective of any degree or concentration of precipitation.

A further object of our invention is to provide a reliable, compact, portable means for instantaneously sampling air and evaluating any particle concentration wherein a continuously fresh sampling surface is presented to minimize the problem of oversampling.

Other objects of our invention will be obvious or will appear from the specification hereinafter set forth.

Our invention and FIGS. 1–5 will now be described in detail as follows.

Figure 1:
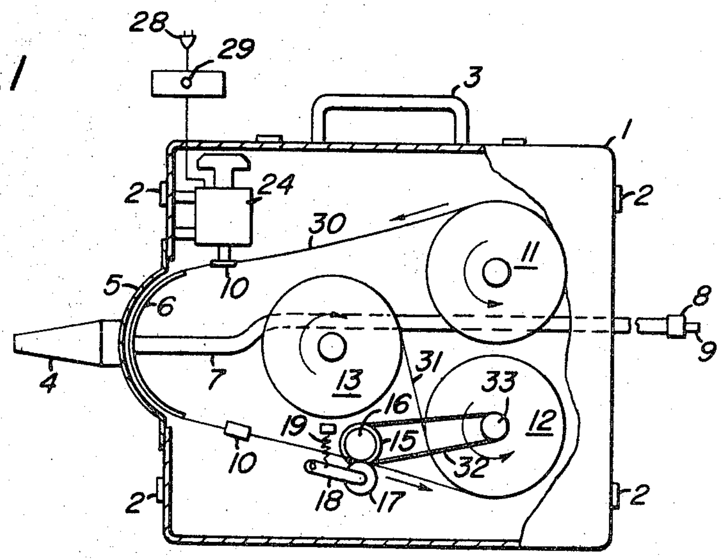
FIG. 1 is a schematic diagram of our air sampling apparatus.
Figure 2:
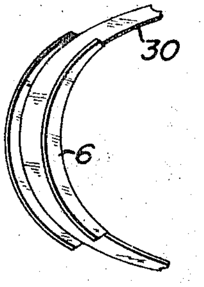
FIG. 2 is a perspective view showing the paper tape located within the guide means located behind the inlet nozzle in FIG. 1.
Figure 3:
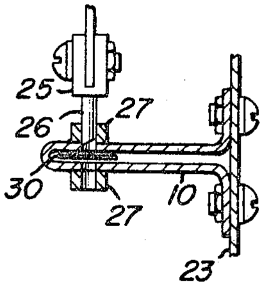
FIG. 3 is a perspective view of the hole puncher of the apparatus shown in FIG. 1.
Figure 4:
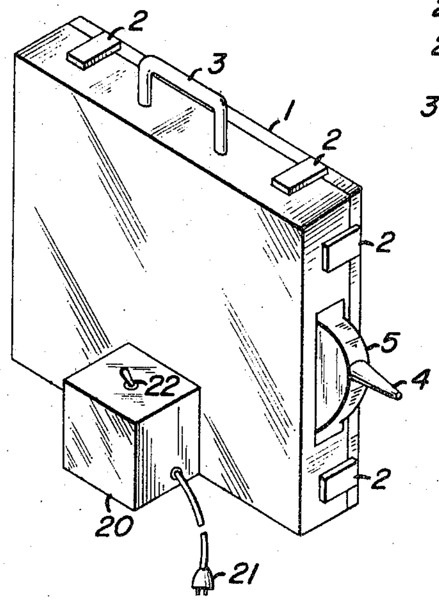
FIG. 4 is a view of our portable apparatus in the closed state preparatory to transport to the sampling site or storage.
Figure 5:
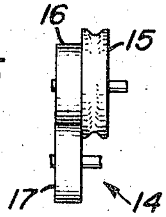
FIG. 5 is a perspective view of the paper tape drive means for the apparatus shown in FIG. 1.

As shown in FIGS. 1 and 4, the component subcombinations of our invention are housed in case 1 which may be made of any convenient material. Case 1 is retained in a closed position for transport and storage purposes by conventional trunk latches 2, and handle 3 is provided for convenience of carrying. Sampling nozzle 4 is removably mounted by conventional thread means (not shown in the drawing) within mount 5. Such removable mounting provides for the interchange of nozles having various orifice sizes to allow sampling of any desired upper limit particle size, as described in U.S. Patent No. 2,894,877. Mount 5 is fixedly mounted to case 1 in any conventional manner such as by screw means, rivet means, or welding means. Guide means 6, having the same contour as mount 5 as shown in FIGS. 1 and 2, is mounted by fixed mounts (not shown in the drawing) attached to case 1 by any conventional fastening means such as screws, bolts, nuts, etc. and within case 1 behind and in a plane parallel to the plane of mount 5. A hole of suitable diameter (not shown in the drawing) is located in the center of guide 6 and axially aligned with the orifice (not shown in the drawing) of nozzle 4. An elongated vacuum tube 7 is located within the hole in guide 6 and is brazed in the conventional manner to the side of guide 6 opposite to the mount 5 side. Tube 7 extends within case 1 the length of the case and through a hole (not shown in the drawing) in the rear end of the case, the end opposite to the nozzle end. Metering means 8 is removably mounted to the end of tube 7 at the rear end and outside of case 1 by conventional thread means (not shown in the drawing). Such removable mounting provides for the interchange of metering means having various orifice sizes to permit any desirable airstream flow rate. Metering means 8 is connected to a conventional vacuum exhaust system (not shown in the drawing) by any conventional connection means 9, such as the type of connector disclosed in U.S. Pat. No. 2,305,841. Upper and lower envelope guide means 10 having the configuration as shown in FIG. 3 are fixedly mounted within case 1 in the same manner as described above regarding guide means 6. FIG. 3 is illustrative of the conventional nut and bolt mode of mounting guide 10 to case 1, wall 23. Guide means 10 are located adjacent to each end of guide means 6 and axially aligned with a tangent to the hemisphere plane of guide 6, the tangent being drawn to a point corresponding to each end of guide 6. To feed and take-up paper tape, conventional feed reel 11 and take-up reel 12, having the same diameters, are mounted in the conventional manner within case 1 by means of mixed mounts (not shown in the drawing) attached to case 1 by any conventional fastening means such as screws, bolts, and nuts, etc. Reels 11 and 12 are located adjacent to the rear of case 1, reel 11 being above reel 12, in such alignment that a line passing through guide means 6 and 10 passes tangent to the upper surface of reel 11 and the lower surface of reel 12. To feed a layer of suitable plastic tape, the only requirement being that the tape have sufficient strength as in the case of conventional tape recorder tape such as Mylar, between the layers of paper tape and avoid cross particle contamination of the paper, feed reel 13, having the same diameter as reels 11 and 12, is fixedly mounted within case 1 in the same manner as described above regarding reels 11 and 12. Reel 13 is located between reels 11 and 12 and guide 10; the horizontal center line of reel 13 falling midway between the horizontal center lines of reels 11 and 12. Feed reel 13 is of such alignment that a tangent to the upper surface thereof will fall tangent to the upper surface of reel 11, and a tangent to the lower surface of reel 13 will fall tangent to the lower surface of reel 12. Paper tape drive means 14, as shown in FIGS. 1 and 5, is mounted within case 1 below reel 13 in the conventional manner by means of fixed mounts (not shown in the drawing) attached to case 1 by any conventional fastening means such as screws, bolts, and nuts, etc. Drive means 14 comprises four integral parts, as shown in FIGS. 1 and 5; namely, pulley means 15, friction wheel 16 fixedly mounted on pulley 15, and friction wheel 17 contacting paper tape 30 opposite to wheel 16 and connected to spring loaded idler 18, the loading accomplished by spring 19. Means 14 is located between guide 10 and reel 12 in such alignment that a line passing axially through guide 10 and tangent to the lower surface of reel 12 will pass between the contacting surfaces of friction wheels 16 and 17. Pulley 15 is connected in the conventional manner to variable gear motor 20, which drives reels 12 and 13 by means of belt 32 attached to pulley 33 and pulley 15, the motor being 115 v. AC, 60 cycle, synchronous, without fan, having clockwise rotation, 15 r.p.m., and producing 26 in. lb. of torque. The gears of motor 20 are interchangeable to provide for any desirable gear ratio and to allow the paper tape to be operated at any desirable speed of travel. By knowing the speed of tape travel and analyzing the cut tape sections, subsequently described, it is possible to calculate the particle concentration per unit of time. The motor is operated by inserting plug 21 into a conventional AC outlet and switching conventional switching means 22 to the on position. Time marker means 24, as shown in FIG. 1, is fixedly mounted within case 1 above upper guide means 10 by any conventional mounting means such as illustrated regarding the mounting of guide 10 in FIG. 3 and described above. Marker 24 is a conventional electrically operated solenoid modified by having knife edge assembly 25 removably attached to the solenoid shaft as illustrated in FIG. 3. The marker assembly is so located that knife edge 26, on the solenoid shaft down stroke, will pass through guide means 27 fixedly mounted and axially aligned with a hole (not shown in the drawing) in the end of upper guide 10 opposite to the wall mounted end. Guide means 27 is mounted in any conventional manner such as brazing, welding, threaded means, etc. Marker 24 is operated by inserting plug 28 into a conventional AC outlet and pushing conventional push button 29.

To monitor the aerosol particle contamination of the atmosphere, plastic tape 31 is fed from feed reel 13 to take-up reel 12 in the conventional manner, such as feeding film in a camera; suitable paper tape 30 is threaded from feed reel 11 through upper guide 10, as shown in FIG. 3, over guide 6, as shown in FIG. 2, through lower guide 10 in the same manner as for upper guide 10, between friction rollers 16 and 17, and attached to take-up reel 12 over plastic tape 31 in the conventional manner as described above regarding the paper tape; motor 20 is started in operation which causes the plastic tape to be fed onto reel 12 by the rotation of reel 12 by means of belt 32 being activated by the motor and the simultaneous superimposing of paper tape on the plastic tape on reel 12 by the action of wheels 16 and 17 being activated by the motor.

Paper tape 30 can be any paper meeting the tabulated requirements as follows:

| Property: | Requirement |
|---|---|
| Air resistance, millimeters of water | 22 to 28. |
| Surface cracking | None permitted. |
| Capillary rise rate, seconds | 5 to 11. |
| Thickness, inches | 0.024 to 0.027. |
| Dry tensile strength, pounds per inch width in machine direction | 7.0 minimum. |
| Wet tensile strength, pounds per inch width in machine direction | 2.4 minimum. |
| Basis weight, pounds per 3000 square feet | 90 to 97. |
| Wetting rate, seconds | 0.1 maximum. |
| Brightness | 87.0±1.0. |
| Wet strength, resin retention, percent | 0.8 maximum. |

The simultaneous superimposing of paper tape on plastic tape produces a sandwich construction of a layer of paper between two layers of plastic to avoid cross contamination between alternate layers of paper. The vacuum system (not shown in the drawing) is started in operation subsequent to the tapes being activated, and a stream of air containing aerosol particles is drawn through nozzle 4 to contact paper tape 30. Any aerosol particles present in the airstream are deposited on the paper tape, and the air, with the particles removed, continues through vacuum tube 7 to be exhausted outside of the apparatus in the conventional manner as described in U.S. Patent No. 3,001,402. During the period of sampling, button 29 is depressed at all desirable intervals, the time of depression being noted, to cause knife edge 26 to cut a hole on the edge of the paper tape 30 in order to determine the particle concentration at that given time. At the conclusion of the sampling period, the apparatus is shut down, the paper tape is cut at the marker location if any remains, and the plastic tape is cut between reels 12 and 13 if any remains, and reel 12 is removed from the apparatus. The tape which has been removed is cut into suitable lengths, such as a 2 cm. strip, chemically analyzed as described in U.S. Patent No. 3,222,925, and concentration time curves are plotted from the analytical data in the conventional manner.

All dimensions of the above described apparatus can be adjusted within the skill of the art to meet any given space and monitoring requirements.

It is obvious that other modifications can be made of our invention, and we desire our invention to be limited only by the scope of the appended claims.

We claim:

1. An apparatus for instantaneous and continuous monitoring aerosol particles in the atmosphere as a function of time comprising a compact and portable case means adapted to contain and carry all components necessary for monitoring; a mount means mounted on the outside wall of one end of said case means; a first hole means located in said mount means; a second hole means located in the end of said case means opposite to said mount means; a nozzle means; a channel shaped guide means mounted within said case means; a third hole means located in said channel shaped guide means; a first envelope guide means mounted within said case means; a second envelope guide means mounted within said case means; a first feed reel means located within said case means; a take-up reel means located within said case means; a second feed reel means located within said case means;

a first tape means being wound on said second feed reel means; a second tape means being wound on said first feed reel means; means adapted to activate said take-up reel; means adapted to activate said second tape means; means adapted to punch holes in said second tape means, said means to punch holes comprising an electrically activated solenoid means; an elongated tube means within said case means; means for metering fluid flow; maens for connecting said metering means to a means to activate the fluid flow; a fourth hole means located within the upper and lower surfaces of said first envelope guide means adjacent to the closed end thereof; a first cylindrical guide means fixedly mounted on the upper surface of said first envelope guide means and axially aligned with said fourth hole means; a second cylindrical guide means fixedly mounted on the lower surface of said first envelope guide means and axially aligned with said fourth hole means; and a knife edge means removably attached to the shaft of said solenoid means and adapted to operate as a piston within said first and second cylindrical guide means; and means to activate the fluid flow, said monitoring being accomplished in no more than one second.

2. The apparatus of claim 1 wherein said mount means is curvilinear and fixedly mounted equidistant between the top and bottom of said case means, said mount means being adapted to mounting a nozzle means therein.

3. The apparatus of claim 1 wherein said first hole means is located in the center of said mount means, said hole means having female thread means located therein and being adapted to interchangeably receive nozzle means having various orifice sizes.

4. The apparatus of claim 1 wherein said second hole means is horizontally offset from the center of the case end to provide a means for avoiding the components mounted within said case means.

5. The apparatus of claim 1 wherein said nozzle means is adapted to have orifice means of various sizes to interchangeably substitute nozzle means of predetermined orifice size, said nozzle means having male thread means located on the larger diameter end, said male thread means being adapted to mate with the female thread means to provide interchangeability, said orifice means being adapted to axially align with the first hole means.

6. The apparatus of claim 1 wherein said channel shaped guide means is curvilinear and fixedly mounted adjacent to said mount means.

7. The apparatus of claim 1 wherein said third hole means is axially aligned with said first hole means and located in the center of said channel shaped guide means.

8. The apparatus of claim 1 wherein said first envelope guide means has an open end and a closed end, said guide means being fixedly mounted at the open end adjacent to the upper end of said channel shaped guide means, said first envelope guide means being aligned to provide for tape to pass axially through the first envelope guide means and fall tangent to the arc of the channel shaped guide means at the upper end of the channel shaped guide means.

9. The apparatus of claim 1 wherein said second envelope guide means has an open end and a closed end, said guide means being fixedly mounted at the open end adjacent to the lower end of said channel shaped guide means, the second envelope guide means being aligned to provide for tape to pass axially through the second envelope guide means and fall tangent to the arc of the channel shaped guide means at the lower end of the channel shaped guide means.

10. The apparatus of claim 1 wherein said first and second envelope guide means comprise an upper surface, a lower surface, and a space between said upper and lower surfaces adapted to pass a tape means therethrough.

11. The apparatus of claim 1 wherein said first feed reel means is located adjacent to the top of said case means and the end of said case means wherein said second hole means is located, said reel means being aligned to provide for tape means being tangent to the upper surface of said first feed reel means to pass axially through said first envelope guide means.

12. The apparatus of claim 1 wherein said take-up reel means is located below said first feed reel means, the center of said take-up reel means being located in vertical axial alignment with the center of said first feed reel means.

13. The apparatus of claim 1 wherein said second feed reel means is located between said channel shaped guide means, said first reel means, and said take-up reel means, said take-up reel means being aligned to provide for tape means being tangent to the lower surface of the take-up reel means to pass axially through the second envelope guide means.

14. The apparatus of claim 1 wherein the center of said second feed reel means is located equidistant between the centers of said first feed reel means and said take-up reel means, said second feed reel means being aligned to provide the upper surface of the second feed reel means to fall within a plane which is tangent to the upper surface of the first feed reel means and to provide the lower surface of the second feed reel means to fall within a plane which is tangent to the lower surface of said take-up reel means.

15. The apparatus of claim 1 wherein said first tape means is plastic, said tape means being adapted to be attached to said take-up reel and transferred from said second feed reel means to said take-up reel means.

16. The apparatus of claim 1 wherein said second tape means is paper, said tape means being adapted to be transferred from said first reel means to said take-up reel means, said second tape means being adapted to be axially fed through the first envelope guide means, over the channel shaped guide means, axially through the second envelope guide means, and attached to said take-up reel means superimposed on the first tape means.

17. The apparatus of claim 1 wherein the means to activate said take-up reel comprises a motor, a plurality of pulley means, and a belt means connecting said pulley means, one pulley means being located on the take-up reel means and a second pulley means being rotatably mounted on the shaft of the motor.

18. The apparatus of claim 1 wherein said means to activate said second tape means comprises a first friction wheel means rotatably mounted on said shaft of said motor and in contact with the upper surface of said second tape means, a second friction wheel means fixedly connected to a spring loaded idler means, and a spring loaded idler means fixedly mounted within said case means, said second friction wheel means contacting the lower surface of the second tape means at a point opposite to the location where the first friction wheel means contacts the upper surface of the second tape means.

19. The apparatus of claim 1 wherein said elongated tube means has one end fixedly mounted within said third hole means and the other end thereof located within said second hole means and extending outside of said case means; said elongated tube means being offset between the channel shaped guide means and said second feed reel means, said offset being of sufficient angular degree as to axially align the offset portion of the tube means with the offset second hole means.

20. The apparatus of claim 1 wherein the means for metering fluid flow is removably mounted to the end of said tube means extended outside of said case means, the means for removably mounting the metering means being a thread means.

21. The apparatus of claim 1 wherein the means for connecting the metering means to a fluid flow activation means is a hose coupling means.

22. The apparatus of claim 1 wherein the means to activate the fluid flow is a vacuum exhaust system means.

(References on following page)

References Cited

UNITED STATES PATENTS

| | | | |
|---|---|---|---|
| 1,573,825 | 2/1926 | Grunfeld | 352—129 |
| 2,169,230 | 8/1939 | Martile | 346—78X |
| 2,894,877 | 7/1959 | Sinden | 195—103.5 |
| 2,897,719 | 8/1959 | Tiller | 352—228 |
| 3,035,445 | 5/1962 | Evans et al. | 73—28X |
| 3,218,115 | 11/1965 | Barocela | 352—221X |
| 3,252,370 | 5/1966 | Luther | 352—221X |
| 2,896,196 | 7/1959 | Hartford et al. | 73—105X |
| 1,656,522 | 1/1928 | Josepho | 95—94 |
| 3,266,293 | 8/1966 | Hubner | 73—23 |
| 3,295,359 | 1/1967 | Peck | 73—28 |

FOREIGN PATENTS

| | | | |
|---|---|---|---|
| 683,840 | 4/1964 | Canada | 73—28 |

OTHER REFERENCES

Dieringer et al.: "Air Sampling," July 1954, pp. 1086–1089, contained in "Instruments and Automation," vol. 27.

RICHARD C. QUEISSER, Primary Examiner

E. J. KOCH, Assistant Examiner

U.S. Cl. X.R.

73—170